US007950999B2

(12) United States Patent
Morrow et al.

(10) Patent No.: US 7,950,999 B2
(45) **Date of Patent: *May 31, 2011**

(54) USER INTERFACE SYSTEM AND METHOD FOR A GAMING MACHINE

(75) Inventors: James Morrow, Sparks, NV (US); Carmen Dimichele, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/943,771

(22) Filed: Sep. 16, 2004

(65) Prior Publication Data

US 2006/0068906 A1 Mar. 30, 2006

(51) Int. Cl.
*A63F 13/00* (2006.01)

(52) U.S. Cl. ........................................... 463/31; 463/16

(58) Field of Classification Search .............. 463/29–33, 463/40–42, 1, 6; 345/762; 715/762
See application file for complete search history.

(56) References Cited

U.S. PATENT DOCUMENTS 3,662,105 A 5/1972 Hurst et al.
4,448,419 A 5/1984 Telnaes
4,676,506 A 6/1987 Crouch
4,718,672 A 1/1988 Okada
4,837,728 A 6/1989 Barrie et al.
4,856,787 A 8/1989 Itkis
5,429,361 A 7/1995 Raven et al.
5,655,961 A 8/1997 Acres et al.
5,702,304 A 12/1997 Acres et al.
5,741,183 A 4/1998 Acres et al.
5,752,882 A 5/1998 Acres et al.
5,759,102 A 6/1998 Pease et al.
5,769,716 A 6/1998 Saffari et al.
5,770,533 A 6/1998 Franchi
5,779,545 A 7/1998 Berg et al.

(Continued)

FOREIGN PATENT DOCUMENTS

AU 704691 4/1997

(Continued)

OTHER PUBLICATIONS

"Screen Scraping" from Wikipedia, retrieved on Nov. 9, 2007 at http://en.wikipedia.org/wiki/Screen_scraping.*

(Continued)

*Primary Examiner* — Ronald Laneau
*Assistant Examiner* — Ross A. Williams
(74) *Attorney, Agent, or Firm* — Steptoe & Johnson LLP

(57) ABSTRACT

An embedded additional user interface 10 includes a web page display screen 20 and an embedded processor 30, and is incorporated into a gaming machine 40 that in turn includes a gaming screen 50 and a gaming processor 60. The embedded processor 30 employs an internal operating system and communicates with the gaming processor 60. The embedded processor reads incoming data, translates the data into a web authoring language, and maps the data to the web page display screen. The display screen 20 presents web page information to a user via the display screen, thereby increasing user excitement by providing a richer gaming experience. This provides a dramatic improvement over traditional system components 70 (input/output peripherals) that have been used in the past to access service and system information, such as a 2-line, 20-character VF display and a 12-digit keypad.

46 Claims, 9 Drawing Sheets

U.S. PATENT DOCUMENTS 5,796,389 A 8/1998 Bertram et al.
5,809,482 A 9/1998 Strisower
5,816,918 A 10/1998 Kelly et al.
5,820,459 A 10/1998 Acres et al.
5,833,536 A 11/1998 Davids et al.
5,833,540 A 11/1998 Miodunski et al.
5,836,817 A 11/1998 Acres et al.
5,851,148 A 12/1998 Brune et al.
5,876,284 A 3/1999 Acres et al.
5,885,158 A 3/1999 Torango et al.
5,919,091 A 7/1999 Bell et al.
5,967,896 A 10/1999 Jorasch et al.
5,973,696 A 10/1999 Agranat et al.
5,984,779 A 11/1999 Bridgeman et al.
6,008,784 A 12/1999 Acres et al.
6,010,404 A 1/2000 Walker et al.
6,068,552 A 5/2000 Walker et al.
6,071,190 A 6/2000 Weiss et al.
6,077,163 A 6/2000 Walker et al.
6,110,041 A 8/2000 Walker et al.
6,113,495 A 9/2000 Walker et al.
6,135,884 A 10/2000 Hedrick et al.
6,162,122 A 12/2000 Acres et al.
6,244,958 B1 6/2001 Acres
6,254,483 B1 7/2001 Acres
6,257,981 B1 7/2001 Acres et al.
6,267,675 B1 * 7/2001 Lee .................................. 463/40
6,280,328 B1 8/2001 Holch et al.
6,302,790 B1 10/2001 Brossard
6,312,333 B1 11/2001 Acres
6,315,666 B1 * 11/2001 Mastera et al. ................. 463/31
6,319,125 B1 11/2001 Acres
6,332,099 B1 12/2001 Heidel et al.
6,364,768 B1 4/2002 Acres et al.
6,364,769 B1 4/2002 Weiss et al.
6,371,852 B1 4/2002 Acres
6,375,567 B1 4/2002 Acres
6,375,569 B1 4/2002 Acres
6,431,983 B2 8/2002 Acres
6,457,099 B1 9/2002 Gilbert
RE37,885 E 10/2002 Acres et al.
6,565,434 B1 5/2003 Acres
6,607,441 B1 8/2003 Acres
6,652,378 B2 * 11/2003 Cannon et al. .................. 463/20
6,712,697 B2 3/2004 Acres
6,712,698 B2 * 3/2004 Paulsen et al. .................. 463/30
6,722,985 B2 4/2004 Criss-Puszkiewicz
6,722,986 B1 4/2004 Lyons et al.
6,800,030 B2 10/2004 Acres
6,832,958 B2 12/2004 Acres et al.
6,908,391 B2 * 6/2005 Gatto et al. ..................... 463/42
6,910,964 B2 6/2005 Acres
6,916,247 B2 * 7/2005 Gatto et al. ..................... 463/42
RE38,812 E 10/2005 Acres et al.
7,007,278 B2 * 2/2006 Gungabeesoon ............. 719/311
7,043,641 B1 * 5/2006 Martinek et al. .............. 713/187
7,093,040 B1 * 8/2006 Mach ............................ 710/100
D531,333 S 10/2006 Acres et al.
7,124,413 B1 * 10/2006 Klemm et al. ................ 719/313
7,290,072 B2 * 10/2007 Quraishi et al. .............. 710/105
2002/0016206 A1 * 2/2002 Yoshimi et al. ................. 463/42
2002/0065136 A1 * 5/2002 Day ................................ 463/42
2002/0111206 A1 8/2002 Van Baltz et al.
2002/0183105 A1 12/2002 Cannon et al.
2003/0060247 A1 3/2003 Goldberg et al.
2003/0100372 A1 5/2003 Gatto et al.
2004/0002378 A1 1/2004 Acres et al.
2004/0002383 A1 1/2004 Lundy et al.
2004/0100490 A1 5/2004 Boston et al.
2004/0142750 A1 7/2004 Glisson et al.
2004/0214622 A1 * 10/2004 Atkinson .......................... 463/1
2005/0141509 A1 6/2005 Rabie et al.

FOREIGN PATENT DOCUMENTS

EP 0769769 A1 4/1997
WO 2004/024260 3/2004

OTHER PUBLICATIONS

Advertisement on Gaming Products & Services/Bingo Manager Magazine, Table of Contents, vol. 5, No. 7, Jul. 1997.

* cited by examiner

USER INTERFACE SYSTEM AND METHOD FOR A GAMING MACHINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system that incorporates an additional user interface, and more particularly, to a system and methodology that integrates an embedded additional user interface having an animation capable display screen into a gaming machine.

BACKGROUND OF THE INVENTION

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As stated above, attempts to distribute gambling-related information and advertisements to players, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Accordingly, those skilled in the art have long recognized the need for a system that is capable of integrating expanded service and systems capabilities with the more traditional function of a gaming device. The claimed invention clearly addresses these and other needs.

SUMMARY OF THE INVENTION

Briefly, and in general terms, the claimed invention resolves the above and other problems by providing an embedded additional user interface for use in a gaming machine, wherein the gaming machine includes a gaming screen and a gaming processor. More particularly, the embedded additional user interface includes a web content capable display screen and an embedded processor. Preferably, the web content capable display screen presents web information to a user via the display screen. The embedded processor preferably utilizes an internal operating system and communicates with the gaming processor. Preferably, the embedded processor reads incoming data, translates the data into a web protocol (web authoring language), if necessary, and maps the data to the web content capable display screen. In this manner, the web content capable display screen increases user excitement by providing a richer gaming experience.

In accordance with another aspect of a preferred embodiment, the incoming data received by the embedded additional user interface are $I^2C$ messages (or other serial communications). Preferably, the embedded processor communicates with the gaming processor, and/or other connected devices, over an $I^2C$ bus (or other serial communications bus). The web content capable display screen of the embedded additional user interface is preferably a color graphic touch screen display. Preferably, the embedded processor is at least a 32-bit processor. Further, the internal operating system of an embedded additional user interface is preferably customized to match the specific hardware to which the internal operating system attaches.

In accordance with another aspect of a preferred embodiment, the embedded processor utilizes cryptographic technology. In one preferred embodiment, a certification process is offered for authentication and non-repudiation of the web content. Preferably, the certification process provides auditability and traceability. Specifically, the certification process provides sufficient security for gaming regulators to allow casino operators to design their own content.

In accordance with another aspect of a preferred embodiment, HTML is the web protocol into which the incoming data is translated in the embedded additional user interface. In another preferred embodiment, DHTML is the web protocol into which the incoming data is translated in the embedded additional user interface. In still another preferred embodiment, XML is the web protocol into which the incoming data is translated in the embedded additional user interface. In yet another preferred embodiment, MACROMEDIA FLASH animation technology is the web protocol into which the incoming data is translated in the embedded additional user interface. In one preferred embodiment, the embedded additional user interface connects to an Ethernet-networked backbone. Further, in one preferred embodiment, the embedded additional user interface connects to a web server through an Ethernet-networked backbone.

In another preferred embodiment, the embedded additional user interface includes an animation capable display screen and an embedded processor. In yet another preferred embodiment, the embedded additional user interface includes a web page display screen and an embedded processor. In still another preferred embodiment, the embedded additional user interface includes a multimedia display screen and an embedded processor.

In accordance with another preferred embodiment, the claimed invention is directed towards an embedded additional user interface that is incorporated into a gaming machine that includes a separate gaming screen (or gaming region, e.g., spinning reels). The embedded additional user interface includes a web content capable display screen and an embedded processor. Preferably, the web content capable display screen presents web information to a user via the display screen. The embedded processor preferably utilizes an internal operating system. The embedded processor reads incoming data, translates the data into a web protocol (web authoring language), if necessary, and maps the data to the web content capable display screen. Furthermore, in this embodiment the embedded processor additionally includes standard gaming processor functionality, and as such, replaces the standard gaming processor in the gaming machine.

In accordance with another preferred embodiment, the claimed invention is directed towards a gaming machine that includes an embedded additional user interface having a web page display screen. Preferably, the gaming machine includes a gaming display screen, a gaming processor, and an embedded additional user interface. The embedded additional user interface further includes the same web page display screen and an embedded processor that has been described above.

In accordance with another preferred embodiment, the claimed invention is directed towards a method for increasing user excitement relating to a gaming machine by providing a richer gaming experience via an embedded additional user interface that is incorporated into the gaming machine. Preferably, the embedded additional user interface includes an embedded processor and a web page display screen. The method preferably includes: receiving a serial data message containing enhanced player information over a serial communication bus (e.g., an $I^2C$ bus) in the embedded additional user interface; translating the data message into a web authoring language, if necessary; and mapping the data message to the web page display screen, wherein the display screen presents web page information to a user via the display screen.

In one embodiment, the web content is protected by digital signature verification using DSA (Digital Signature Algorithm) or RSA (Rivest-Shamir-Adleman) cryptographic technology. In this regard, the content is preferably protected using digital signature verification so that any unauthorized changes are easily identifiable. Of course, other suitable protection techniques may also be used in other embodiments.

Still further, one preferred embodiment utilizes a Message Authentication Code (MAC), which may be used to verify both the content integrity and the authenticity of a message. A Message Authentication Code can be generated faster than using digital signature verification technology, although it is not as robust. In one preferred embodiment, the authentication technique utilized is a bKey (electronic key) device. A bKey is an electronic identifier that is tied to a particular individual.

Typically, in a preferred embodiment, the data is authenticatible and non-repudiatible, rather than hidden or otherwise obfuiscated (encrypted). Non-repudiation is a way to guarantee that the sender of a message cannot later deny having sent the message, and that the recipient cannot deny having received the message.

In accordance with one preferred embodiment, one or more gaming machine system or embedded additional user interface components (or content) are assigned identification codes. The components are grouped together into a protected group of component bindings using cryptographic security procedures and the identification codes of the components in the bindings group. Accordingly, the bindings prevent falsification or repudiation of content entries with respect to any modifications or replacements of components or content within the bindings group.

In accordance with another aspect of a preferred embodiment, every content entry must be authenticated by being digitally signed with a Hashed Message Authorization Code that is based on the entry itself and on the individual identification codes of the components and content in the bindings group. In the same manner, every entry that attempts a replacement of any of the embedded additional user interface components or content must be authenticated by being digitally signed with a Hashed Message Authorization Code that is based on the entry itself and on the individual identification codes of the components and content in the bindings group.

Preferably, the identification codes of the embedded additional user interface components are randomly or pseudo-randomly generated. In accordance with another aspect of the verification system, a Hashed Message Authorization Code key for authenticating access to the component bindings is produced using a SHA-1 hash that is generated using the individual identification codes of the components in the bindings group. Additionally, the embedded additional user interface components are secured within the component bindings using a SHA-1 hash that is generated using the individual identification codes of the components and content in the bindings group.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

A preferred embodiment of the embedded additional user interface, constructed in accordance with the claimed invention, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments of the invention.

Figure 1:
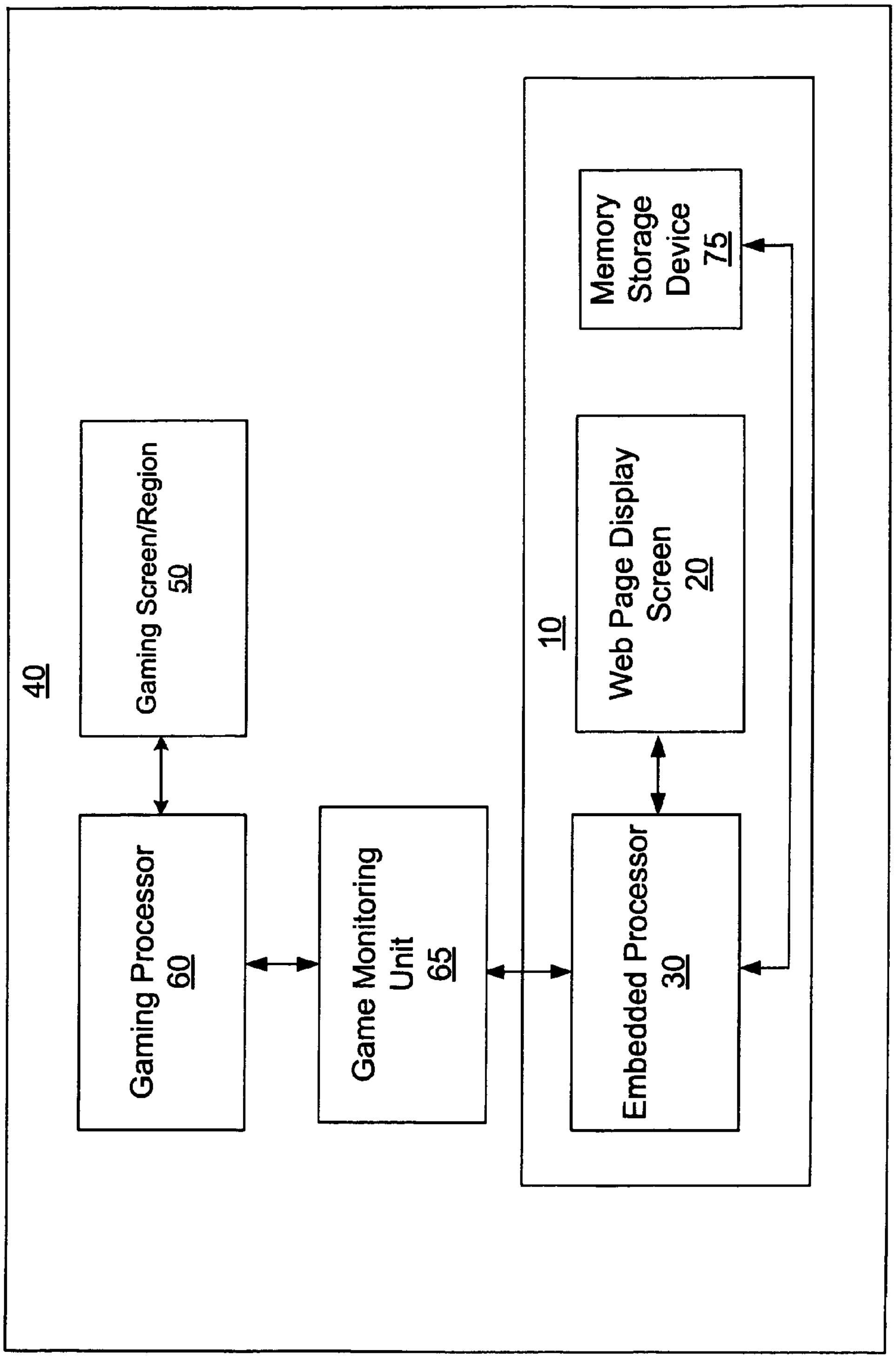
FIG. 1 illustrates a relational diagram of an embedded additional user interface, constructed in accordance with the claimed invention, utilizing a web page display screen and an embedded processor that receives data messages from a game monitoring unit that are translated into web page content and mapped to the web page display screen.

Referring now to the drawings, wherein like reference numerals denote like or corresponding parts throughout the drawings and, more particularly to FIGS. 1-5, there is shown one embodiment of an embedded additional user interface 10. Specifically, FIG. 1 shows an embedded additional user interface 10 that includes a web page display screen 20 and an embedded processor 30. The user interface 10 is incorporated into a gaming machine 40 that, in turn, includes a gaming screen 50, (and/or non-screen gaming region 50, e.g., spinning reels or other gaming presentation) gaming processor 60, and a game monitoring unit 65. The embedded processor 30 employs an internal operating system and communicates with the gaming processor 60. The embedded processor 30 reads incoming data, translates the data into a web authoring language, and maps the data to the web page display screen 20. The display screen 20 presents web page information to a user via the display screen, thereby increasing user excitement by providing a richer gaming experience. The game monitoring unit 65 monitors the information that is input through the user interface 10. This provides a dramatic improvement over traditional system components 70 (input/output peripherals, such as 2-line, 20 character VF (Vacuum Fluorescent) displays and 12-digit keypads) that have been used as in the past to provide user information. The user interface 10 communicates with the game monitoring unit 65 in the same manner as the previous system components 70 communicated with the game monitoring unit.

Figure 2:
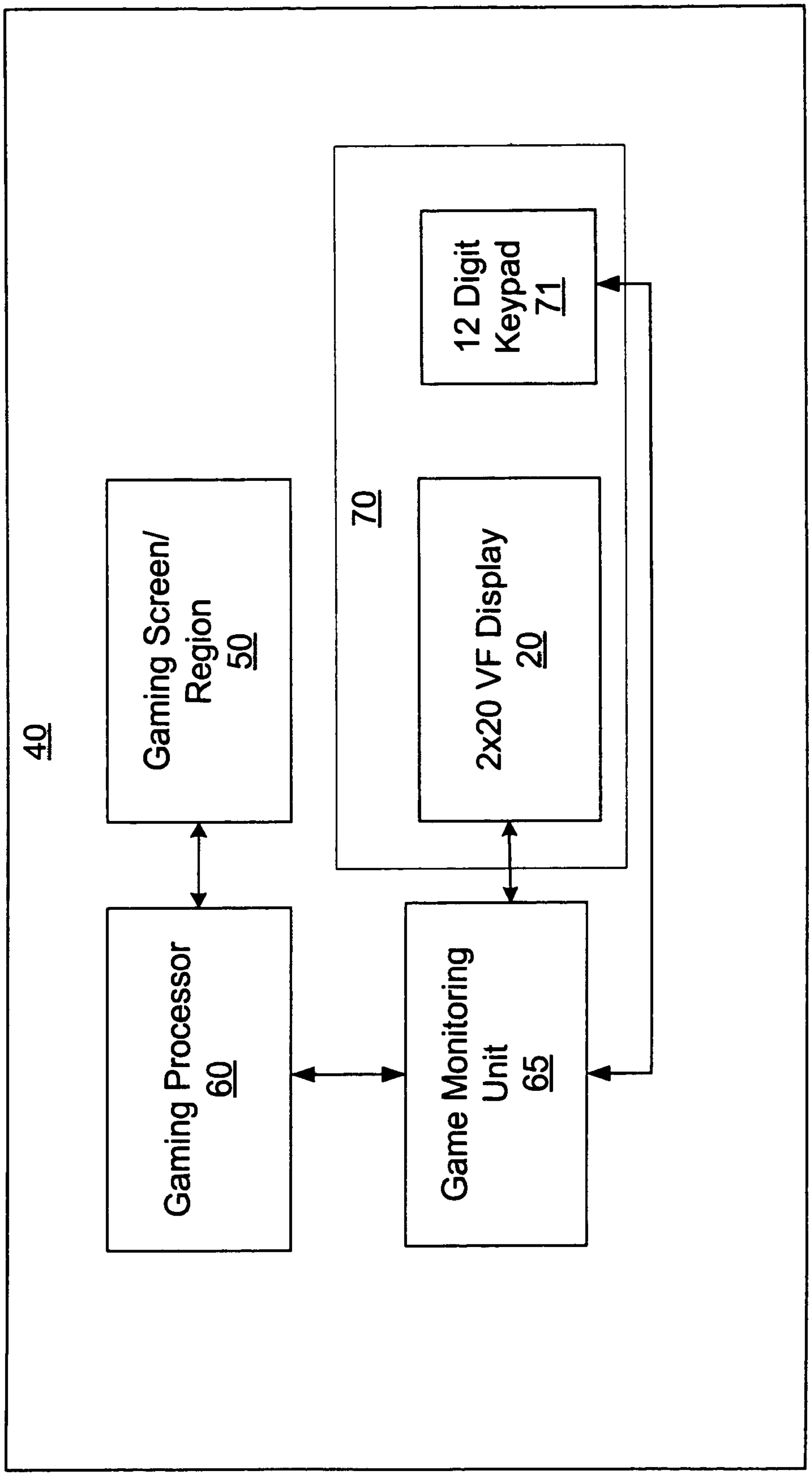
Fig. 2 (Prior Art)
FIG. 2 illustrates a relational diagram of a prior art gaming system that utilizes a 2×20 VF display and 12-digit keypad.

As shown in FIG. 2, prior art gaming devices typically utilized a single video display screen as a gaming screen 50 for the gaming machine 40, while additional system components 70 were attached or juxtapositioned next to the gaming machine. However, in a preferred embodiment of the claimed invention, the system components 70 that were used in prior art systems are replaced with the embedded additional user interface 10 to provide the advanced functionality of a web page display screen 20. Such functionality includes, by way of example only, and not by way of limitation, the ability to display animation, multimedia, and other web-type content. The embedded additional user interface 10 enables presentation of additional information (e.g., enhanced player information) to a player (or potential player) through the web page display screen 20 in an exciting, eye-catching format, while not interfering with the normal gaming processes being displayed on the gaming screen 50. Further, the embedded additional user interface 10 does not interfere with the normal gaming hardware in the gaming machine 40, but rather is easily integrated into a gaming machine 40.

Referring again to FIG. 1, in situations involving multiple gaming machine (or gaming component) manufactures, an embedded additional user interface 10 can be incorporated into a gaming machine (either originally or by retrofitting) without requiring access to the game logic or other gaming systems that might be proprietary and inaccessible with a gaming machine from another gaming manufacturer. Thus, in a preferred embodiment of the claimed invention, the embedded additional user interface 10, which includes a web page display screen 20 for presenting supplementary information to a player, is incorporated into a gaming machine 40 in addition to the standard gaming screen 50 typically found in a gaming machine. The embedded additional user interface 10 may also be incorporated into a gaming machine 40 that utilizes a gaming region (e.g., a reel-spinner) instead of a standard gaming screen 50. This supplemental information may include general gaming information, player specific information, player excitement and interest captivation content, advertising content (targeted or otherwise), and the like. Further, in other preferred embodiments, the embedded additional user interface 10 may have the ability to interact with the game logic of the gaming processor 60, and thus, provide further functionality, such as bonus games and/or the ability to incorporate awards, promotional offers, or gifts from the web page display screen 20 to the gaming screen 50. Moreover, the web page display screen 20 may display supplemental information in an "attract mode" when there is no game play occurring.

In a preferred embodiment of the claimed invention, the embedded additional user interface 10 is used to make casino services more accessible and friendly to casino patrons. In one preferred embodiment, the embedded additional user interface 10 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI bus (Enhanced Player Interface bus), which uses industry standard $I^2C$ hardware and signaling.

In one preferred embodiment, the embedded additional user interface 10 is used to replace/upgrade an EPI bus. Preferably, the embedded additional user interface 10 replaces the EPI bus in the gaming machine in a "plug and play" manner. In other words, the old EPI bus can be unplugged and the new embedded additional user interface 10 can simply be plugged into the $I^2C$ bus of the gaming machine 40, where the user interface 10 utilizes the currently employed industry standard $I^2C$ hardware and signaling without requiring any further modification. The embedded processor 30 of the embedded additional user interface 10 reads incoming $I^2C$ data (content), translates the data into a web authoring language (e.g., HTML, DHTML, XML, MACROMEDIA FLASH), and maps the data to the web page display screen 20. In this manner, the previous $I^2C$ data messages, which were typically presented on a 2-line, 20 character VF display, are automatically transformed by the embedded additional user interface 10 into an attention grabbing, animated (multimedia) web page style format. This results in enhanced player satisfaction and excitement with extremely minimal retrofitting requirements.

Since, in one preferred embodiment, the embedded additional user interface 10 utilizes $I^2C$ hardware and signaling, this enables the user interface 10 to speak and understand the $I^2C$ protocol message set, and thus, communicate directly with the gaming processor 60 of the gaming machine 40 (or other networked devices) in the same fashion in which the gaming processor previously communicated with the EPI bus. Accordingly, in a preferred embodiment of the claimed invention, the functionality of the previously utilized hardware (e.g., the EPI bus) is replaced and substantially upgraded with the integration of the embedded additional user interface 10 into the gaming machine 40. As such, the external hardware of any such system components (e.g., a keypad and a 2-line, 20 character VF display) is eliminated.

As stated above, in one preferred embodiment, the incoming data received by the embedded additional user interface 10 is $I^2C$ signaling protocol; however, in other preferred embodiments other serial communication protocols (or electronic communication format) are utilized. Preferably, the embedded processor 30 communicates with the gaming processor 60, and/or other connected devices, over an $I^2C$ bus (or over another serial communications bus in embodiments that utilize another protocol). The web page display screen 20 of the embedded additional user interface 10 is preferably a color-graphic touch screen display. Preferably, the embedded processor 30 is at least a 32-bit processor. A preferred embodiment utilizes a 32-bit processor because cryptographic techniques, such as SHA-1 and DSA algorithms, are written and operate natively on a 32-bit system. Additionally, the Microsoft® Windows® environment, which is utilized in some preferred embodiments of the claimed invention, is also 32-bit. Further, the internal operating system of the embedded additional user interface 10 is preferably customized to match the specific hardware to which the internal operating system attaches.

Preferably, the embedded additional user interface 10 is an embedded computer board that, in addition to the embedded processor 30 and the web page display screen 20, further includes a removable COMPACT FLASH card 75 (or other memory storage device), as shown in FIG. 1, and a network adapter port. Content and feature updates to the embedded additional user interface 10 are accomplished by physically swapping out the COMPACT FLASH card 75 (or other memory storage device). Thus, in order to retrieve data from the embedded additional user interface 10, the data is accessed by physically removing and reading the COMPACT FLASH card 75.

In one preferred embodiment, the internal operating system utilized by the embedded processor 30 of the embedded additional user interface 10 is WINDOWS® CE version 4.2 (or higher). Preferably, the embedded additional user interface 10 is built upon a PXA255-based board developed by the Kontron Corporation. Additionally, in a preferred embodiment of the embedded additional user interface 10, the browser control for the web page display screen 20 is MICROSOFT® INTERNET EXPLORER® 6.0 (or higher), which is shipped standard with WINDOWS® CE 4.2, the preferred internal operating system for the embedded processor 30.

A preferred embodiment of the embedded additional user interface 10 also provides a mechanism for inputting system information into, and retrieving system information from, the game machine 40. As stated above, the embedded additional user interface 10 preferably uses industry standard $I^2C$ hardware and signaling. The $I^2C$ protocol has multi-master capabilities, i.e., is capable of participating as both a slave and as a master. The embedded additional user interface 10 enables system information (such as information input by a player into a web page display screen 20) to be sent from the game machine 40 to a slot system network (or to another destination location). Likewise, the embedded additional user interface 10 also enables the system information (such as display messages) to be sent from the systems network (or from another source location) to the game machine 40 for viewing by the player through the web page display screen 20.

In a preferred embodiment, information can also be input by a user into the web page display screen 20 of the user interface 10. The web page display screen 20 of the user interface 10 employs a virtual keypad. Further, the user interface 10 uses a keypad dictionary that allows a user to be able to enter a vastly greater amount of information than was previously possible using a 12 digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 40 within a particular casino. By utilizing the embedded additional user interface 10 of the claimed invention, the gaming network interface can be instructed to move fluids between player's accounts and gaming devices by merely touching the web page display screen 20. In addition, many other more sophisticated commands and instructions may be provided. Thus, the embedded additional user interface 10 improves the player and casino employee interface to the gaming machine 40, directly at the gaming device itself.

In a preferred embodiment of the claimed invention, the web page display screen 20 of the embedded additional user interface 10 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 20 are used by the player to navigate between windows in web page display screen 20 and allow access to system functions such as cashless withdraw, balance requests, system requests, points redemption, and the like. In other preferred embodiments of the claimed invention, the web page display screen 20 utilizes various other data input techniques commonly known in the art, instead of the touch screen data entry. Thus, implementation of the embedded additional user interface 10 is an efficient, highly beneficial, and substantial upgrade to a gaming machine 40 that greatly increases the functionality over what was previously possible using an EPI bus.

In one preferred embodiment, text data messages are translated into web page navigation requests by the embedded processor 30 and then displayed on the web page display screen 20. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this embodiment, commands that were previously displayed on the 2×20 VF display are matched to a corresponding URL and a browser is used to render the page on the web page display screen 20. The web pages displayed contain touch-screen keys that effectively emulate hardware keys.

In one preferred embodiment of the claimed invention, a dictionary URL approach is used for translating the data messages into web page information. In this manner, data messages are "looked up" in a dictionary data file where they can be redirected to an attractive URL. The embedded processor 30 responds to requests on the $I^2C$ bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. As each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page.

Accordingly, a URL Dictionary component is used to map a text string, sent from the embedded processor 30 and intended for the display on the 2×20 VF display, to a URL that can be used to display a much more visually enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In this event that a message is not in the URL Dictionary, such a message is mapping to a page that substitutes for the 2-line mode.

In the preferred embodiments described above, the embedded processor 30 of the embedded additional user interface 10 reads incoming $I^2C$ data messages, translates the $I^2C$ data messages into a web authoring language (e.g., HTML, DHTML, XML, MACROMEDIA FLASH), and maps the newly translated web page data message to the web page display screen 20. Additionally, the embedded additional user interface 10 can also read incoming data messages that are already in a web authoring language (e.g., HTML, DHTML, XML, MACROMEDIA FLASH), and map this web page data to the web page display screen 20. Further, and highly advantageously, a preferred embodiment of the claimed invention also allows casinos that are using the embedded additional user interface 10 to design and use their own content, thereby giving the casinos the ability to decide what the web page presented on the web page display screen 20 of the user interface 10 will look like.

Figure 3:
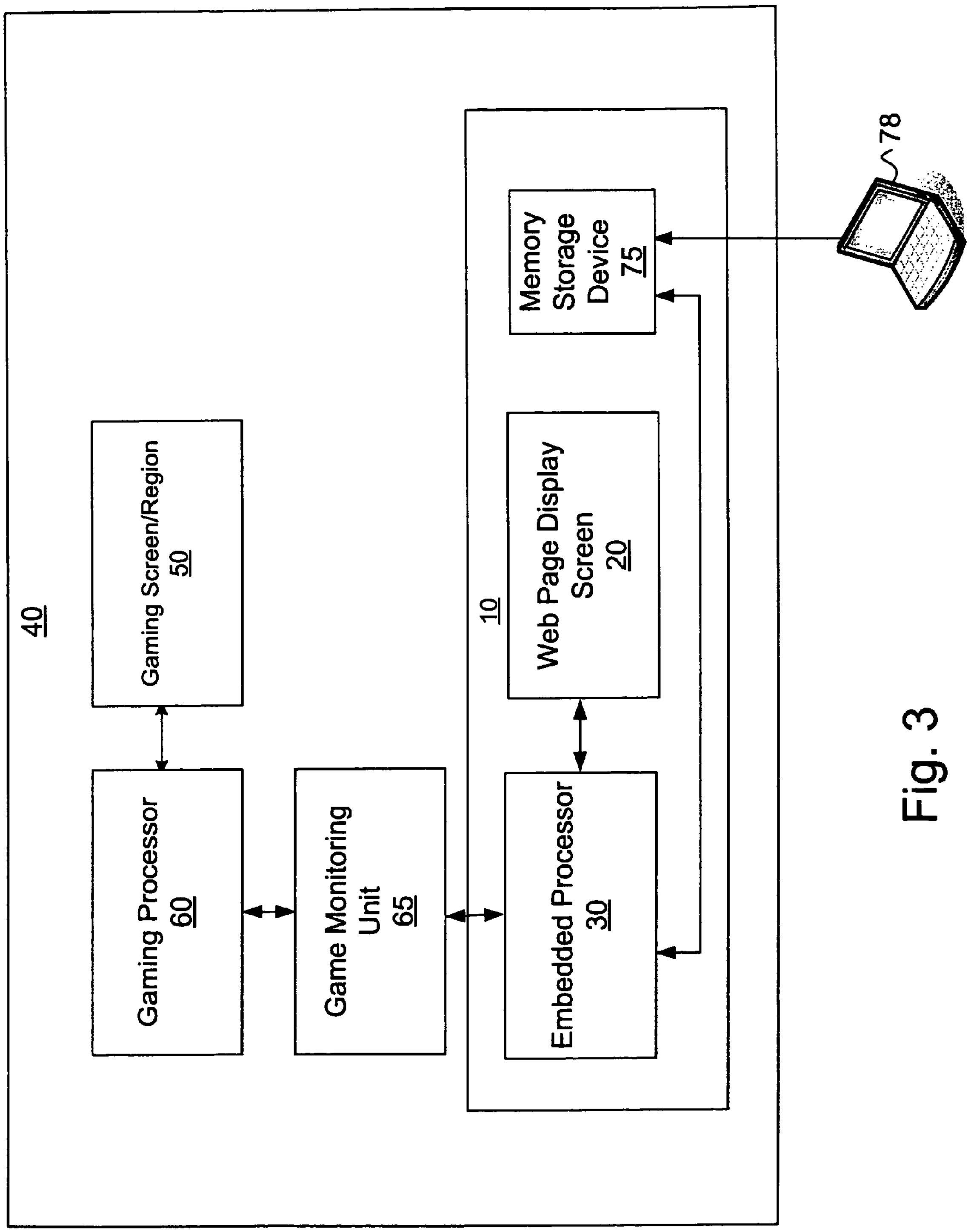
FIG. 3 illustrates a relational diagram of embedded additional user interface, constructed in accordance with the claimed invention, utilizing a web page display screen and an embedded processor that receives cryptographically certified web page content from a portable computer via a network adapter port.

Referring now to FIG. 3, in this preferred embodiment, content may be locally downloaded. Specifically, in one preferred embodiment, the content is updated through a physical USB (or other connection) that is used to download the new content. In one preferred embodiment, the data on the COMPACT FLASH card 75 can be accessed by connecting a separate computer 78 to the network adapter port of the embedded additional user interface 10. This embodiment allows updating the contents of the operating system, changing the operating system itself, and receiving data from the Compact Flash card 75. Physical removal of the COMPACT FLASH card 75 is also still be an option for update and inspection of files on the embedded additional user interface 10.

In one preferred embodiment, a portable computer is used store and publish data content to the COMPACT FLASH card 75 on the embedded additional user interface 10, as well as to receiving data from the COMPACT FLASH card 75 on the embedded additional user interface. In this embodiment, all content on the embedded additional user interface 10 is authenticated as if it were a gaming machine.

In another preferred embodiment, a network adapter port is run on the embedded computer board of the user interface 10. This embodiment also includes a boot loader. Further, in this embodiment, the portable computer 78 (described above) includes components for use in uploading data to, and downloading data from, the COMPACT FLASH card 75 on the embedded additional user interface 10. Specifically, the components that run on the portable computer 78 are for moving new data content to the embedded additional user interface 10, and for validation and verification of the data content that is on the embedded additional user interface. Preferably, all data that is used to update the COMPACT FLASH card 75 moves to or from the embedded additional user interface 10 over the single built in network adapter port on the board.

Prior to the advent of the embedded additional user interface 10 of the claimed invention, gaming regulators would have been unwilling to allow casino operators to design their own content. However, due to the cryptographic technology implemented by the embedded processor 30 in the embedded additional user interface 10, a certification process is provided by the claimed invention with sufficient security for gaming regulators to allow casino operators to design their own content. Specifically, in one preferred embodiment, the certification process offered ensures authentication and non-repudiation of the casino operator designed web content. Preferably, in the claimed invention the certification process provided further ensures auditability and traceability. Various cryptographic technologies, such as authentication and non-repudiation (described herein below), are utilized in preferred embodiments of the claimed invention, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a ×509 certificate) that allow for limited access. Thus, this preferred embodiment allows the attributes within the certificate are used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored-in the database in addition to the identification number.

In another preferred embodiment, the claimed invention utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage, because it can be created and stored more rapidly than digital signature verification technology.

In one preferred embodiment, the authentication technique utilized is a bKey (electronic key) device. A bKey is an electronic identifier that is tied to a particular individual. In this manner, any adding, accessing, or modification of content that is made using a bKey for authentication is linked to the specific individual to which that bKey is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combined in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of bKey clearance or classification is required to make specific changes.

Figure 4:
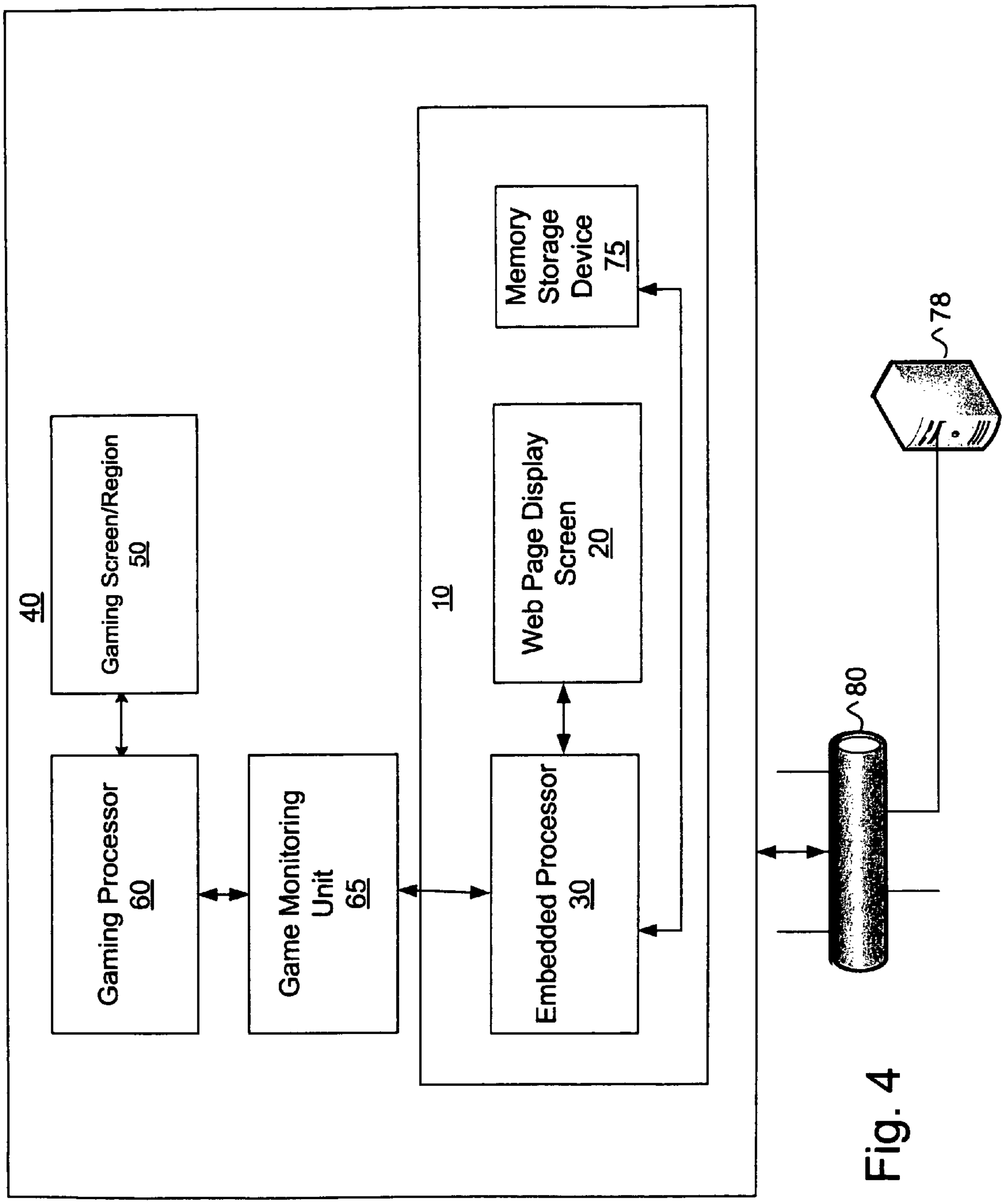
FIG. 4 illustrates a relational diagram of embedded additional user interface, constructed in accordance with the claimed invention, utilizing a web page display screen and an embedded processor that receives web page content from a back-end server via an Ethernet-networked backbone.

Referring now to FIG. 4, in one preferred embodiment, the embedded additional user interface 10 connects to an Ethernet-networked backbone 80 instead of a local system network. Currently, casino networks are not Ethernet, but rather are smaller, more simplistic local system networks. Thus, in this Ethernet-networked backbone 80 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless any suitable protocol may be used.

Further, in another preferred embodiment, the embedded additional user interface 10 connects to a full featured, back end, download configuration server 90 through the above-described Ethernet-networked backbone 80 as shown in FIG. 4. In such an embodiment, the full-featured server 90 can schedule downloads of content (gaming or otherwise) as well as upload information from the gaming machines 40, such as what options the gaming machines 40 currently possess. Accordingly, in a preferred embodiment, the primary use of the server 90 is as data download and data retrieval server. While this server 90 does upload and download web content style information, it is typically not connected to the World Wide Web. This server 90 must be authenticated Oust like a gaming machine) to make the content served to the embedded additional user interface 10 acceptable to the gaming regulators. Preferably, utilization of the Ethernet-networked backbone 80 and the server 90 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 90 has its content authenticated in the same manner as the embedded additional user interface 10 to allow content to be downloaded to the web page display screen 20.

Figure 5:
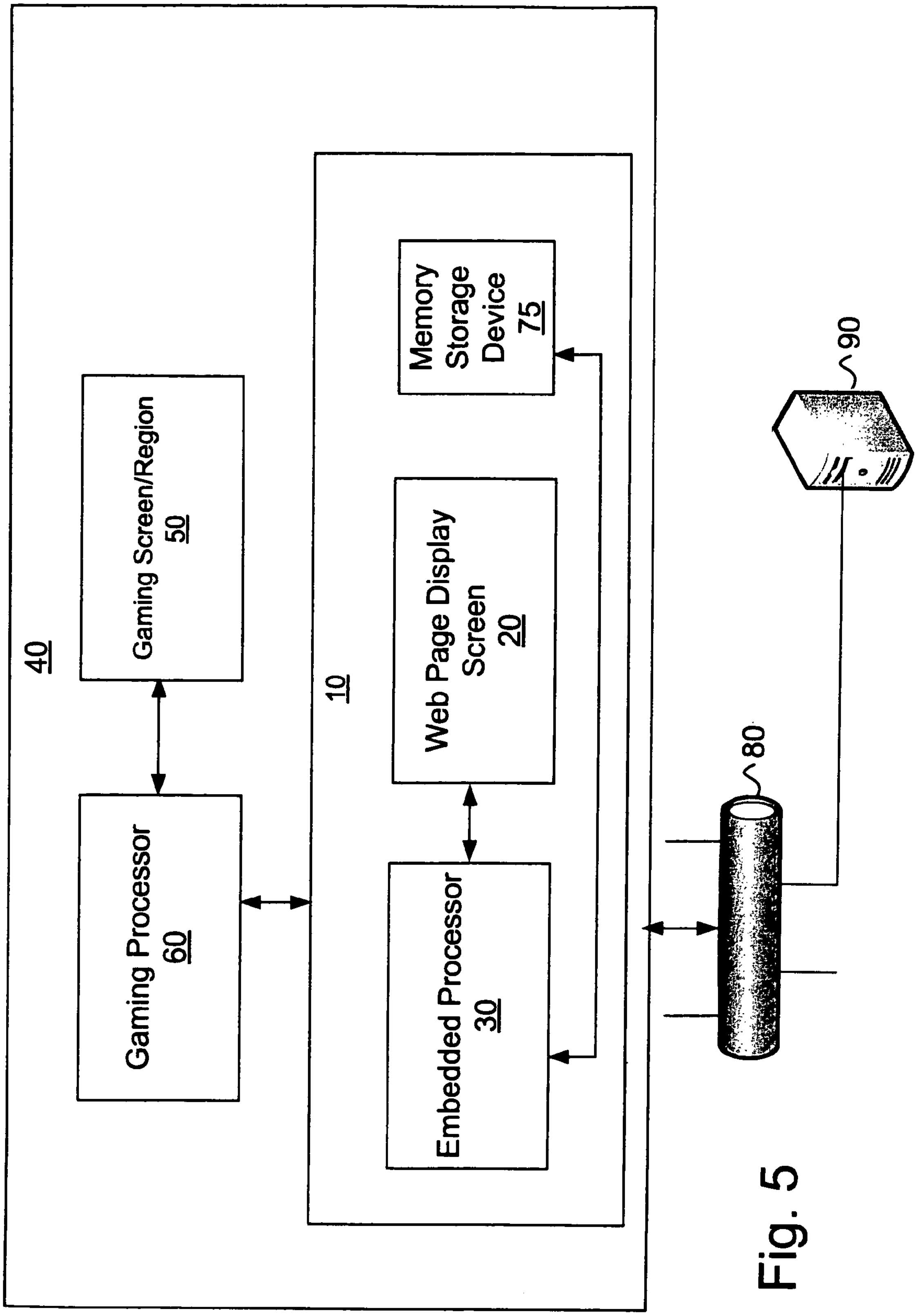
FIG. 5 illustrates a relational diagram of embedded additional user interface, constructed in accordance with the claimed invention, utilizing a web page display screen and an embedded processor that includes the functionality of a standard gaming processor.
Figure 6A:
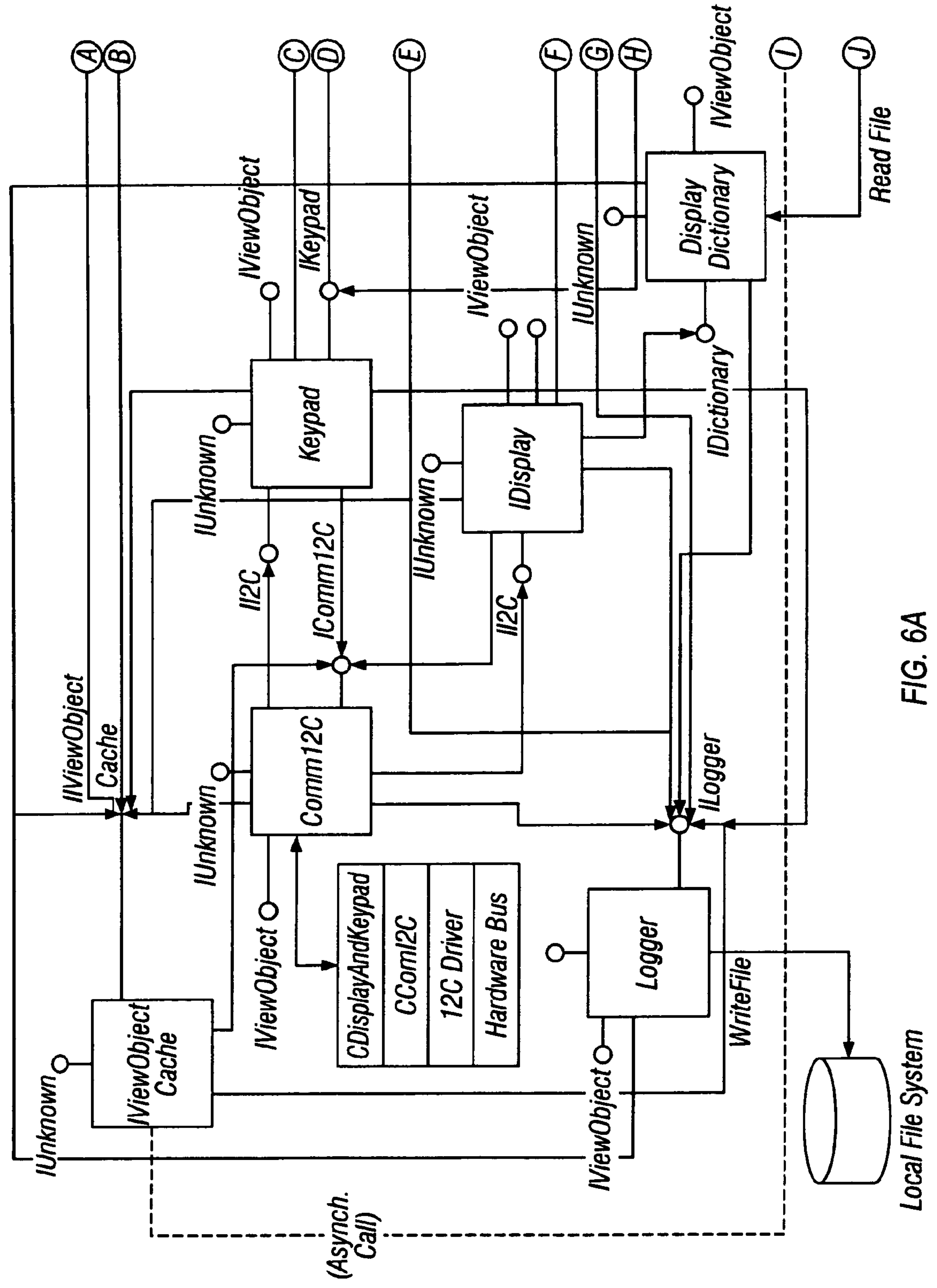
FIG. 6 illustrates an object interaction diagram of embedded additional user interface, constructed in accordance with the claimed invention.
Figure 6B:
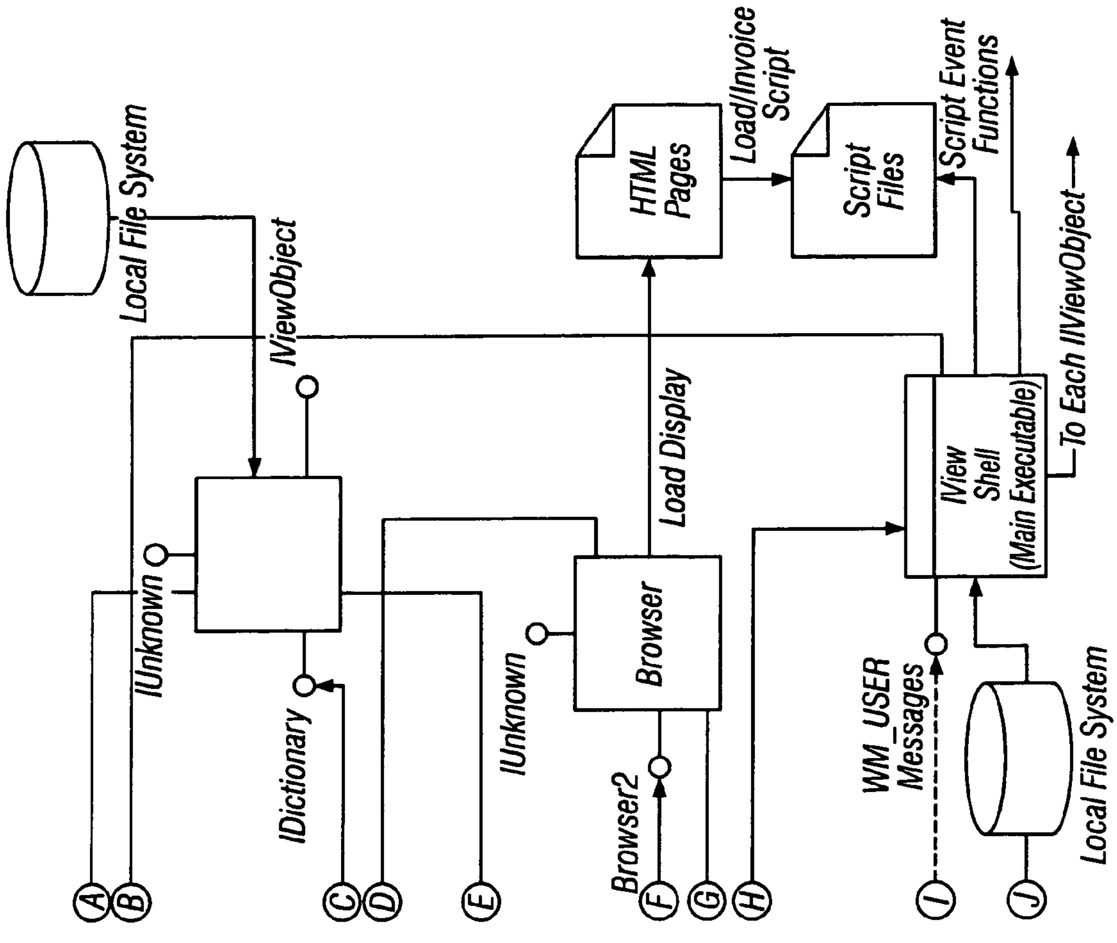
Figure 7:
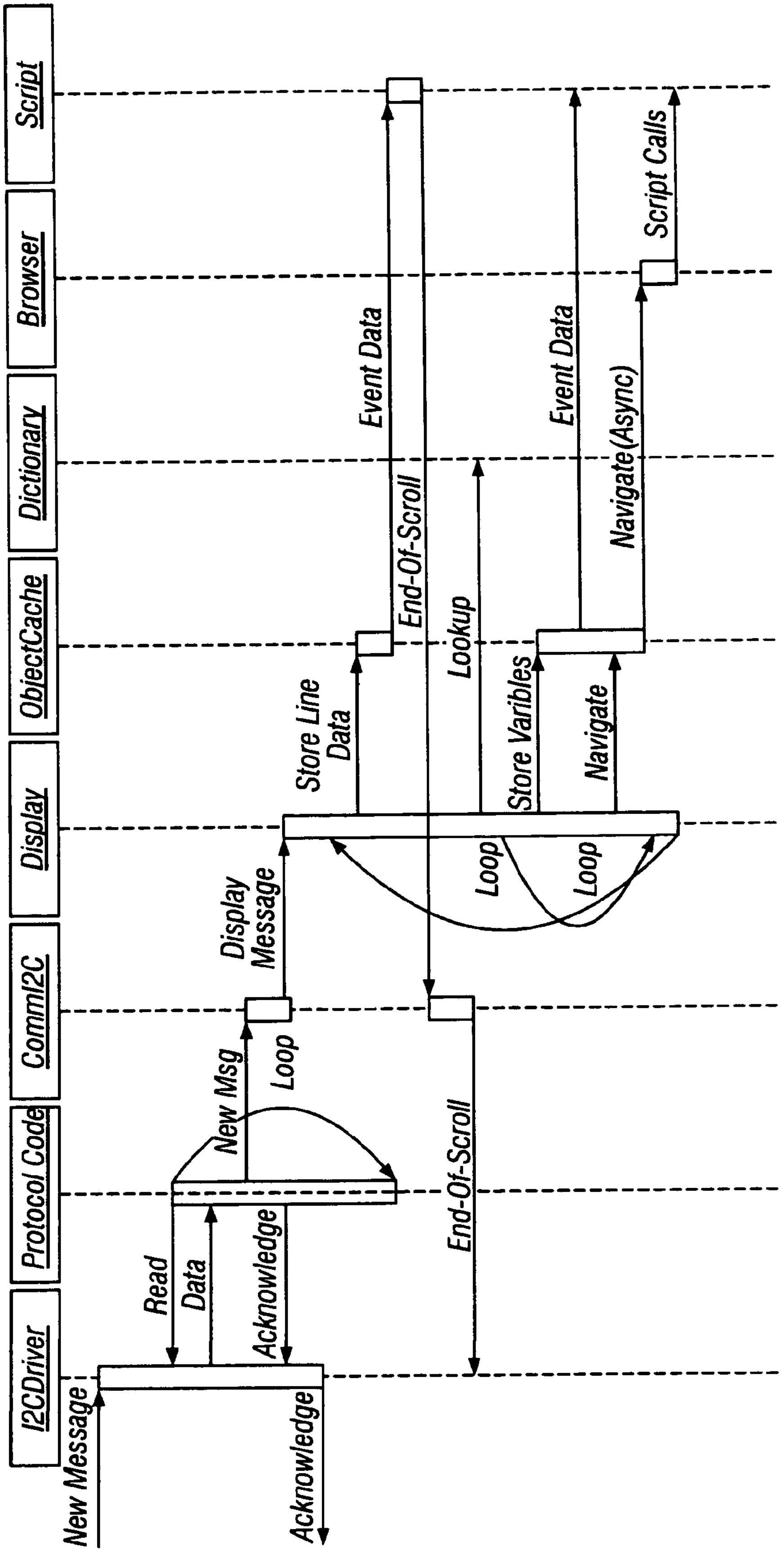
FIG. 7 is a diagram showing the sequence of events that occur when data is sent between the of embedded additional user interface and the game monitoring unit.
Figure 8:
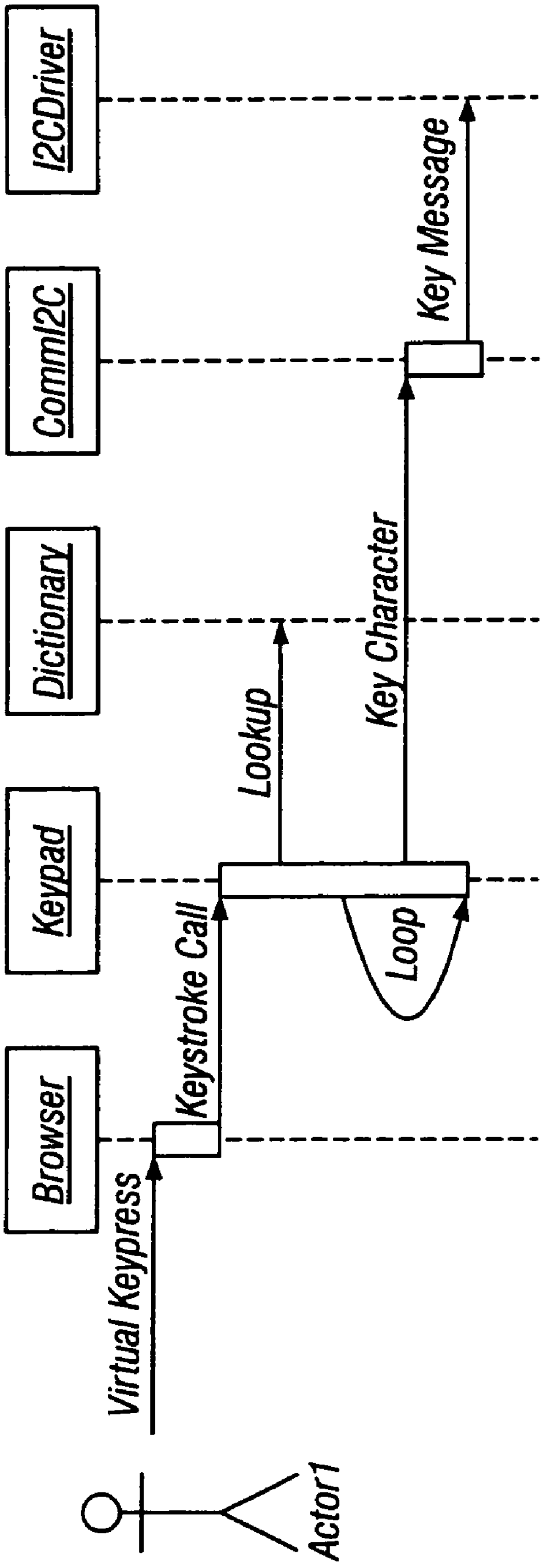
FIG. 8 is a diagram showing the sequence of events that occur when a virtual key is press on the web page display screen.

Referring now to FIG. 5, in another preferred embodiment of the claimed invention, the functions previously performed by the gaming monitoring unit 65, as shown in FIGS. 1-4, of the gaming machine 40 are supported by the embedded processor 30 of the embedded additional user interface 10. Otherwise stated, the GMU code is transitioned from the gaming monitoring unit 65 into the embedded processor 30 in the embedded additional user interface 10. Accordingly, such a configuration removes the need for the gaming monitoring unit 65 in the gaming machine 40. This results in a significant reduction in the amount and complexity of the hardware, as well as completing a phased transition of more traditional style gaming machines into more modernized upgraded gaming machines.

Thus, in such a preferred embodiment, the claimed invention is directed towards an embedded additional user interface 10 that is incorporated into a gaming machine 30, the gaming machine in turn including a gaming screen 50 or other appropriate gaming region (e.g., spinning reels), but does not include a gaming monitoring unit 65. Such an embedded additional user interface 10 still includes a web content capable display screen 20 and an embedded processor 30. Once again, the web content capable display screen 20 presents web information to a user via the display screen. The embedded processor 30 preferably utilizes an internal operating system. Furthermore, in this embodiment the embedded processor 30 additionally includes standard gaming monitoring unit functionality (GMU code), since it replaces the gaming monitoring unit 65 in the gaming machine 40. As before, the embedded processor 30 reads incoming data, translates the data into a web protocol (web authoring language), if necessary, and maps the data to the web content capable display screen 20.

In one embodiment, the embedded additional user interface 10, the messages are flashed (e.g., animation, multimedia, and the like) to the player within the web page display screen 20 while the gaming screen 50 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI bus would only been capable of scrolling this message in one-quarter inch (0.25") tall monochrome text, in contrast, the web page display screen 20 would "flash" this message in bright red, white, black, and green animated format, on six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 10 that utilizes a card reader (or other identification technique, such as a player ID code) to recognize a particular player, the web page display screen 20 displays an eye-catching, web page style message to that player, for example, "Welcome, Mr. Smith!" in response to identifying Mr. Smith. Preferably, the web page display screen 20 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 20 for the player.

For example, in one embodiment, when the "Transactions" touch screen icon button is selected, a new screen is activated that includes the web page style message, "Mr. Smith, Account Balance: Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 20 that provides answers to frequently asked questions and other useful information. Moreover, the web page display screen 20 preferably also includes a "History" button that, when selected, launches a new screen within the web page display screen 20 that provides a history log of all transactions and other actions performed on that gaming machine 40.

In accordance with another preferred embodiment, the claimed invention is directed towards a method for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) bus in the embedded additional user interface 10; translating the data message (using the embedded processor 30) into a web authoring language; and mapping the data message to the web page display screen 20, wherein the display screen presents web page information to a user via the display screen.

The potential advantages of utilizing the embedded additional user interface 10 of the claimed invention are numerous. These potential advantages include, by way of example only, and not by way of limitation; providing animated and/or multimedia web style content, providing fonts and icons which are larger and more aesthetically appealing; providing special services to players, (e.g., multiple languages, assistance for handicapped individuals); facilitating interactive uses of the web page display screen 20; providing the ability to customize the "look and feel" of the web page display screen 20 for players and casino employees; increased player excitement and participation; and simplified replaceability and/or upgradeability from an EPI bus or other similar non-web page style components.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. An embedded user interface incorporated into a gaming machine, the gaming machine including a gaming presentation and gaming processor, the embedded user interface comprising:

a web content capable display screen, wherein the display screen presents web data to a user via the display screen;

a dictionary component, wherein the dictionary component translates an incoming text data message directed to be displayed to a player upon a display screen that was sent over the system network into an XML, HTML, or DHTML enhanced player message directed to be displayed to the player upon the display screen; and an embedded processor that employs an internal operating system and communicates with the gaming processor, wherein the embedded processor reads the incoming text data message directed to be displayed to the player upon the display screen that was sent over the system network and calls the dictionary component that enables display of the translated XML, HTML, or DHTML enhanced player message directed to be displayed to the player upon the web content capable display screen;

whereby the web content capable display screen increases user excitement by presenting a translated outgoing enhanced player message to the player that provides a richer gaming experience than the incoming text data message sent over the system network.

2. The embedded additional user interface of claim 1, wherein the incoming data is a serial communication message.

3. The embedded user interface of claim 1, wherein the embedded processor communicates with the gaming processor over an $I^2C$ bus.

4. The embedded user interface of claim 1, wherein the web content capable display screen is a color graphic touch screen display.

5. The embedded user interface of claim 1, wherein the embedded processor is at least a 32-bit processor.

6. The embedded user interface of claim 1, wherein the internal operating system is customized to match the specific hardware to which the internal operating system attaches.

7. The embedded user interface of claim 1, wherein the embedded processor utilizes cryptographic technology.

8. The embedded user interface of claim 1, wherein a certification process is offered for authentication and non-repudiation of content using a Public Key Infrastructure system, and wherein the certification process provides auditability and traceability using digital signature verification.

9. The embedded user interface of claim 1, wherein the embedded enhanced user interface connects to an Ethernet-networked backbone.

10. The embedded user interface of claim 1, wherein the embedded enhanced user interface connects to a web server through an Ethernet-networked backbone.

11. An embedded user interface for use in a gaming machine, the gaming machine including a gaming presentation and gaming processor, the embedded user interface comprising:

an animation capable display screen, wherein the display screen presents animated information to a user via the display screen;

a dictionary component, wherein the dictionary component translates an incoming text data message directed to be displayed to a player upon a display screen that was sent over the system network into an XML, HTML, or DHTML enhanced player message directed to be displayed to the player upon the display screen; and an embedded processor that employs an internal operating system and communicates with the gaming processor, wherein the embedded processor reads the incoming text data message directed to be displayed to the player upon the display screen that was sent over the system network and calls the dictionary component that enables display of the translated XML, HTML, or DHTML enhanced player message directed to be displayed to the player upon the web content capable display screen;

whereby the animation capable display screen increases user excitement by presenting a translated outgoing enhanced player message to the player that provides a richer gaming experience than the incoming text data message sent over the system network.

12. The embedded additional user interface of claim 11, wherein the incoming data is a serial communication message.

13. The embedded user interface of claim 11, wherein the embedded processor communicates with the gaming processor over an $I^2C$ bus.

14. The embedded user interface of claim 11, wherein the animation capable display screen is a color graphic touch screen display.

15. The embedded user interface of claim 11, wherein the embedded processor is at least a 32-bit processor.

16. The embedded user interface of claim 11, wherein the internal operating system is customized to match the specific hardware to which the internal operating system attaches.

17. The embedded user interface of claim 11, wherein the embedded processor utilizes cryptographic technology.

18. The embedded user interface of claim 11, wherein a certification process is offered for authentication and non-repudiation of content using a Public Key Infrastructure system, and wherein the certification process produces signed content that is auditable and traceable using digital signature verification.

19. The embedded user interface of claim 11, wherein the embedded enhanced user interface connects to an Ethernet-networked backbone.

20. The embedded user interface of claim 11, wherein the embedded enhanced user interface connects to a web server through an Ethernet-networked backbone.

21. An embedded user interface for use in a gaming machine, the gaming machine including a gaming presentation and gaming processor, the embedded user interface comprising:

a web page display screen, wherein the display screen presents web page information to a user via the display screen;

a dictionary component, wherein the dictionary component translates an incoming text data message directed to be displayed to a player upon a display screen that was sent over the system network into an XML, HTML, or DHTML enhanced player message directed to be displayed to the player upon the display screen; and an embedded processor that employs an internal operating system and communicates with the gaming processor, wherein the embedded processor reads the incoming text data message directed to be displayed to the player upon the display screen that was sent over the system network and calls the dictionary component that enables display of the translated XML, HTML, or DHTML enhanced player message directed to be displayed to the player upon the web content capable display screen;

whereby the web page display screen increases user excitement by presenting a translated outgoing enhanced player message to the player that provides a richer gaming experience than the incoming text data message sent over the system network.

22. The embedded additional user interface of claim 21, wherein the incoming data is a serial communication message.

23. The embedded user interface of claim 21, wherein the embedded processor communicates with the gaming processor over an $I^2C$ bus.

24. The embedded user interface of claim 21, wherein the web page display screen is a color graphic touch screen display.

25. The embedded user interface of claim 21, wherein the embedded processor is at least a 32-bit processor.

26. The embedded user interface of claim 21, wherein the internal operating system is customized to match the specific hardware to which the internal operating system attaches.

27. The embedded user interface of claim 21, wherein the embedded processor utilizes cryptographic technology.

28. The embedded user interface of claim 21, wherein a certification process is offered for authentication and non-repudiation of content using a Public Key Infrastructure system, and wherein the certification process provides auditability and traceability using digital signature verification.

29. The embedded user interface of claim 21, wherein the embedded enhanced user interface connects to an Ethernet-networked backbone.

30. The embedded user interface of claim 21, wherein the embedded enhanced user interface connects to a web server through an Ethernet-networked backbone.

31. An embedded user interface incorporated into a gaming machine, the gaming machine including a gaming presentation, the embedded user interface comprising:

a web content display screen, wherein the display screen presents web content information to a user via the display screen;

a dictionary component, wherein the dictionary component contains a listing of possible incoming text data messages directed to be displayed to a player upon a display screen to be supported and translates a listed incoming text data message into an XML, HTML, or DHTML enhanced player message directed to be displayed to the player upon the display screen; and an embedded processor that employs an operating system, wherein the embedded processor reads the incoming text data message directed to be displayed to the player upon the display screen that was sent over the system network and calls the dictionary component that enables display of the XML, HTML, or DHTML enhanced player message directed to be displayed to the player upon the display screen, and wherein the embedded processor additionally includes standard gaming processor functionality;

whereby the web content display screen increases user excitement by presenting a translated outgoing enhanced player message to the player that provides a richer gaming experience than the incoming text data message sent over the system network.

32. The embedded additional user interface of claim 31, wherein the incoming data is a serial communication message.

33. The embedded user interface of claim 31, wherein the embedded processor communicates with the gaming processor over an $1^2$C bus.

34. The embedded user interface of claim 31, wherein the web content display screen is a color graphic touch screen display.

35. The embedded user interface of claim 31, wherein the embedded processor is at least a 32-bit processor.

36. The embedded user interface of claim 31, wherein the internal operating system is customized to match the specific hardware to which the internal operating system attaches.

37. The embedded user interface of claim 31, wherein the embedded processor utilizes cryptographic technology.

38. The embedded user interface of claim 31, wherein a certification process is offered for authentication and non-repudiation of content using a Public Key Infrastructure system, and wherein the certification process provides auditability and traceability using digital signature verification.

39. The embedded user interface of claim 31, wherein the embedded enhanced user interface connects to an Ethernet-networked backbone.

40. The embedded user interface of claim 31, wherein the embedded enhanced user interface connects to a web server through an Ethernet-networked backbone.

41. A gaming machine having a gaming presentation, the gaming machine comprising:

a gaming processor;

a user interface separate from the gaming presentation, the user interface comprising:

a web page screen, wherein the display screen presents web page information to a user via the display screen;

a dictionary component; wherein the dictionary component translates an incoming text data message directed to be displayed to a player upon a display screen that was sent over the system network into an XML, HTML, or DHTML enhanced player message directed to be displayed to the player upon the display screen; and an additional processor that communicates with the gaming processor, wherein the additional processor reads the incoming text data message directed to be displayed to the player upon the display screen that was sent over the system network and calls the dictionary component that enables display of the translated XML, HTML, or DHTML enhanced player message directed to be displayed to the player upon the web page display screen;

whereby the web page display screen increases user excitement by presenting a translated XML, HTML, or DHTML enhanced player message to the player that provides a richer gaming experience than the incoming text data message sent over the system network.

42. A method for increasing user excitement relating to a gaming machine by providing a richer gaming experience via an user interface that is incorporated into the gaming machine, wherein the user interface includes an additional processor and a web page display screen, the method comprising:

receiving an incoming text data message over a communication bus interface in the user interface directed to be displayed to a player upon the web page display screen of the user interface that was sent over the system network;

using a dictionary component and the additional processor of the user interface to translate the incoming text data message directed to be displayed to the player upon the web page display screen of the user interface that was sent over the system network into an XML, HTML, or DHTML enhanced player message; and displaying the translated XML, HTML, or DHTML enhanced player message directed to be displayed to the player upon the web page display screen of the user interface, wherein the display screen presents the translated XML, HTML, or DHTML enhanced player message to the player via the display screen.

43. A user interface for use in a gaming machine, the gaming machine including a gaming presentation and gaming processor, the user interface comprising:

a multimedia display screen, wherein the display screen presents web page information to a player via the display screen;

a dictionary component, wherein the dictionary component translates an incoming text data message directed to be displayed to the player upon the display screen that was sent over the system network into an XML, HTML, or DHTML enhanced player message directed to be displayed to the player upon the display screen; and an additional processor that communicates with the gaming processor, wherein the additional processor reads the incoming text data message directed to be displayed to the player upon the display screen that was sent over the system network and calls the dictionary component that enables display of the translated XML, HTML, or DHTML enhanced player message directed to be displayed to the player upon the multimedia display screen;

whereby the multimedia display screen increases user excitement by presenting a translated XML, HTML, or DHTML enhanced player message to the player that provides a richer gaming experience than the incoming text data message sent over the system network.

44. A gaming machine having a gaming presentation, the gaming machine comprising:

a user interface separate from the gaming presentation, the user interface including a web page display screen, wherein the display screen presents web page information to a user via the display screen;

a dictionary component, wherein the dictionary component translates an incoming text data message directed to be displayed to a player upon the display screen that was sent over the system network into an XML, HTML, or DHTML enhanced player message directed to be displayed to the player upon the display screen; and a processor for controlling game play, wherein the processor additionally reads the incoming text data message directed to be displayed to the player upon the display screen that was sent over the system network and calls the dictionary component that enables display of the translated XML, HTML, or DHTML enhanced player message directed to be displayed to the player upon the web page display screen;

whereby the web page display screen increases user excitement by presenting a translated XML, HTML, or DHTML enhanced player message to the player that provides a richer gaming experience than the incoming text data message sent over the system network.

45. A user interface for use in a gaming machine, the gaming machine including a gaming presentation and gaming processor, the user interface comprising:

a web browser enabled display screen, wherein the display screen presents web page information to a user via the display screen;

a dictionary component, wherein the dictionary component translates an incoming text data message directed to be displayed to the player upon the display screen that was sent over the system network into an XML, HTML, or DHTML enhanced player message directed to be displayed to the player upon the display screen; and an additional processor that communicates with the gaming processor, wherein the additional processor reads the incoming text data message directed to be displayed to the player upon the display screen that was sent over the system network and calls the dictionary component that enables display of the translated XML, HTML, or DHTML enhanced player message directed to be displayed to the player upon the web browser enabled display screen, and wherein the additional processor receive information input by a user through the display screen;

whereby the web browser enabled display screen increases user excitement by presenting a translated XML, HTML, or DHTML enhanced player message to the player that provides a richer gaming experience than the incoming text data message sent over the system network.

46. An embedded user interface incorporated into a gaming machine, the gaming machine including a gaming presentation and gaming processor, the embedded user interface comprising:

a web content capable display screen, wherein the display screen presents web data to a user via the display screen;

an embedded processor that employs an internal operating system and communicates with the gaming processor, wherein the embedded processor reads an incoming text data message directed to be displayed to a player upon the display screen that was sent over the system network, calls a dictionary component that translates the incoming text data messages sent over the system network into an XML, HTML, or DHTML enhanced player message directed to be displayed to the player upon the display screen, and enables display of the translated XML, HTML, or DHTML enhanced player message directed to be displayed to the player upon the web content capable display screen; and a certification process that include authentication and non-repudiation of content using a Public Key Infrastructure system, wherein the certification process enables generation of casino operator-designed content that is gaming regulator-certifiable;

whereby the web content capable display screen increases user excitement by presenting a translated XML, HTML, or DHTML enhanced player message to the player that provides a richer gaming experience than the incoming text data message sent over the system network.

* * * * *

UNITED STATES PATENT AND TRADEMARK OFFICE

CERTIFICATE OF CORRECTION

PATENT NO. : 7,950,999 B2
APPLICATION NO. : 10/943771
DATED : May 31, 2011
INVENTOR(S) : Morrow et al.

It is certified that error appears in the above-identified patent and that said Letters Patent is hereby corrected as shown below:

Column 5
Line 8, delete the word “of” after “the” and before “embedded”

Column 5
Line 11, change “press” to --pressed--

Column 12
Line 57, change “Oust” to --( Just--

Signed and Sealed this
Nineteenth Day of July, 2011

David J. Kappos
*Director of the United States Patent and Trademark Office*